United States Patent
Yamaji et al.

(10) Patent No.: US 9,420,130 B2
(45) Date of Patent: Aug. 16, 2016

(54) IMAGE PROCESSING APPARATUS, IMAGE PROCESSING METHOD, AND NON-TRANSITORY COMPUTER READABLE RECORDING MEDIUM

(71) Applicant: FUJIFILM CORPORATION, Tokyo (JP)

(72) Inventors: Kei Yamaji, Tokyo (JP); Tomohiro Nakagawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 123 days.

(21) Appl. No.: 14/222,687

(22) Filed: Mar. 24, 2014

(65) Prior Publication Data
US 2014/0294256 A1    Oct. 2, 2014

(30) Foreign Application Priority Data
Mar. 27, 2013    (JP) ................ 2013-065517

(51) Int. Cl.
G06K 9/00    (2006.01)
H04N 1/00    (2006.01)
H04N 1/32    (2006.01)

(52) U.S. Cl.
CPC ....... H04N 1/00453 (2013.01); H04N 1/32128 (2013.01); *H04N 2201/3214* (2013.01); *H04N 2201/3215* (2013.01); *H04N 2201/3253* (2013.01); *H04N 2201/3273* (2013.01)

(58) Field of Classification Search
None
See application file for complete search history.

(56) References Cited

U.S. PATENT DOCUMENTS

| 7,797,135 B2 * | 9/2010 | Fitzhugh | G11B 27/034 |
| | | | 702/176 |
| 7,813,560 B2 * | 10/2010 | Kraus | G06F 17/30247 |
| | | | 382/224 |
| 8,502,887 B2 | 8/2013 | Yamamoto | |
| 2005/0110880 A1 * | 5/2005 | Parulski | H04N 1/00127 |
| | | | 348/231.5 |
| 2010/0329635 A1 | 12/2010 | Nishiura | |

FOREIGN PATENT DOCUMENTS

| JP | 2006-197316 | 7/2006 |
| JP | 2007-097076 | 4/2007 |
| JP | 2007-519309 | 7/2007 |

(Continued)

OTHER PUBLICATIONS

English translation of Japanese patent No. (JP-2009-267600), Nov. 12, 2009, pp. 1-9.*

(Continued)

*Primary Examiner* — Daniel Mariam
(74) *Attorney, Agent, or Firm* — Young & Thompson (57) ABSTRACT

An image processing apparatus includes an image storage unit that stores a plurality images having supplementary information respectively, an image analysis unit that performs an image analysis of each image stored in the image storage unit; and a time correction unit that corrects an imaging time that is included in the supplementary information of the image in such a manner that the plurality of images are arranged in an actual imaging time of the images in a case where the plurality of images are arranged in an order of the imaging time among the supplementary information, based on at least one of a result of the image analysis by the image analysis unit and a GPS information that is included in the supplementary information of the images.

18 Claims, 4 Drawing Sheets

(56) References Cited

FOREIGN PATENT DOCUMENTS

| | | |
|---|---|---|
| JP | 2009239691 | 10/2009 |
| JP | 2011009976 | 1/2011 |

OTHER PUBLICATIONS

Japanese Office Action, dated Jan. 27, 2015, in corresponding Japanese Patent Application No. 2013-065517.

* cited by examiner

| 2/22 | | | | | | | -------- |
| 2/24 | | | | | | | -------- |
| 2/31 | | | | | | |  |
| 3/13 | | | | | | | -------- |

IMAGE PROCESSING APPARATUS, IMAGE PROCESSING METHOD, AND NON-TRANSITORY COMPUTER READABLE RECORDING MEDIUM

BACKGROUND OF THE INVENTION

1. Field of the Invention

The present invention relates to an image processing apparatus, an image processing method, and a non-transitory computer readable recording medium that correct an imaging time that is supplementary information of each of plural images in such a manner that the images can be arranged in an order of actual imaging time in a case of arranging the plurality of images in the order of imaging time among the supplementary information.

2. Description of the Related Art

A photo book is a photo album that is created with a user's desired layout by selecting (extracting) and using a predetermined number of images from a plurality of images (image data) owned by a user. In recent years, an automatic layout function to automatically create a layout of each page of a photo book by automatically selecting and using a predetermined number of images from a plurality of images owned by a user, is provided.

In the photo book in the related art, for example, creation of a photo book of hundreds of images imaged in one event such as a trip or a wedding ceremony has been assumed. In contrast, in recent years, creation of a photo book as a commemorative album containing as large a volume as a thousand or a few thousands of images for a year is performed for the users who do not have enough time to create a photo book containing a large number of images.

For example, in a case of creating the photo book containing as large a volume as a thousand or a few thousands of images for a year, a possibility that the images (image data) imaged using one or more imaging apparatuses in which the time setting of the built-in clock is different as in the case of the images imaged by two or more types of imaging apparatuses having different functions such as a digital still camera and a camera on a mobile phone, the images imaged during an overseas trip without changing the set-time of the built-in clock, and the images received from the friends are mixed, is higher than in a case of creating the photo book containing a few hundreds of images in the related art.

For example, in a case of two or more different types of imaging apparatuses, there is a possibility that the time settings of the built-in clocks of each imaging apparatus are different. As in this case, an imaging time as supplementary information of the image imaged by at least one of the two or more imaging apparatuses having a different time setting of the built-in clock is different from the actual imaging time of the image. Similarly, in a case of the images imaged during an overseas trip without changing the set-time of the built-in clock of the imaging apparatus, at least one of an imaging time as supplementary information of the images imaged overseas and domestically is different from the actual imaging time of the image. The case is similar to the images received from the friends.

Therefore, in a case where the images imaged by one or more imaging apparatuses in which the time settings of the built-in clocks are different are mixed, even when arranging a plurality of images in the order of imaging time that is included in the supplementary information of the images, it is not possible to arrange the images in the order of actual imaging time of each image.

In this way, when there is a mismatch between the imaging time that is included in the supplementary information of the images and the actual imaging time of the images, there is a concern that it may not be possible to perform an automatic layout in a case of creating the photo book having a plurality of pages using the automatic layout function of the photo book, for example, by dividing the plurality of images into a predetermined number of groups of which the images are continuously imaged in a predetermined time duration based on the imaging time that is included in the supplementary information of the images, and extracting the images from each of the predetermined number of divided groups to extract a predetermined number of images as a total, and then using the extracted predetermined number of images.

For example, as described above, in a case where there is a mismatch between the imaging time that is included in the supplementary information of the images and the actual imaging time of the images, ordinarily, the images imaged in one event such as cake cutting in a wedding ceremony are classified in one group and are desired to be arranged in one page in the photo book. However, there is a possibility that the images imaged in one event may be arranged in separate pages of the photo book. In addition, in the layout of the photo book, there is a concern that the chronological order of the images may be disrupted.

As related art literature that are relevant to the present invention, there are JP2006-197316A, JP2007-97076A, and JP2007-519309A.

JP2006-197316A relates to a correction method of management data with respect to imaging data. JP2006-197316A discloses a method of correcting an acquired time of a plurality of imaged images by: sequentially counting the current time and thereby obtaining the acquired time of the imaged image; and measuring an elapsed time from the acquired time to the current time; and then associating the imaged image and the acquired time of the imaged image and the elapsed time from the acquired time to the current time; and then back calculating the elapsed time from the corrected time in a case where the correction is performed with respect to the current time.

JP2007-97076A relates to a method of correcting a imaging date for uniformly correcting the imaging date and time in the image data acquired by a plurality of imaging apparatuses. JP2007-97076A discloses a method of correcting the date and time data by: incorporating the image data having the supplementary date and time data that indicate the acquired date and time acquired by the plurality of the imaging apparatuses; and, from the incorporated image data, selecting all of the image data acquired by any one of imaging apparatuses among the plurality of imaging apparatuses; and then correcting the date and time data supplement for all of the selected images.

JP2007-519309A relates to a digital camera that stores date and time of each image incorporated in the digital image file. JP2007-519309A discloses a method of correcting the date and time value of the images by: setting up communications between a digital camera and a separate device that provides the current date and time value; and correcting the date and time value of each of a plurality of digital images imaged by the digital camera based on the difference between the built-in date and time value in the digital camera and the current date and time value of the separate device.

SUMMARY OF THE INVENTION

The present invention is made in order to solve the problems described above and an object thereof is to provide an image processing apparatus, an image processing method, and a non-transitory computer readable recording medium that correct an imaging time that is included in the supplementary information of the images in such a manner that the images can be arranged in the order of actual imaging time in a case of arranging the plurality of images in the order of imaging time among the supplementary information.

To achieve the object, the present invention provides an image processing apparatus including: an image storage unit that stores a plurality of images having respective supplementary information; an image analysis unit that performs an image analysis of each image stored in the image storage unit; and a time correction unit that corrects an imaging time that is included in the supplementary information of the image in such a manner that the plurality of images are arranged in an actual imaging time of the images in a case where the plurality of images are arranged in an order of the imaging time that is included in the supplementary information of the images, based on at least one of a result of the image analysis by the image analysis unit and a GPS information that is included in the supplementary information of the images.

It is preferable that the image analysis unit perform a similar image determination as the image analysis, and that, in a case where the plurality of images are arranged in the order of the imaging time that is included in the supplementary information of the images, the time correction unit corrects the imaging time that is included in the supplementary information of one or more images among two or more images that are determined to be similar images, in such a manner that the two or more images that are determined to be similar images by the result of the similar image determination processing are continuously arranged.

It is preferable that the image analysis unit perform at least one of a face recognition process and a frame determination process as the image analysis, and that, in a case where the plurality of images are arranged in the order of imaging time that is included in the supplementary information of the images, the time correction unit correct the imaging time that is included in the supplementary information of one or more images among two or more images in which at least one of the same person and the same frame is determined to be imaged as the result of at least one of the face recognition process and the frame determination process, in such a manner that the two or more images in which at least one of the same person and the same frame is determined to be imaged are continuously arranged.

It is preferable that, in a case where the plurality of images are arranged in the order of imaging time that is included in the supplementary information of the images, the time correction unit correct the imaging time that is included in the supplementary information of one or more images among two or more images of which the imaging locations corresponding to the GPS information that is included in the supplementary information of the images is included in the predetermined range, in such a manner that the two or more images of which the imaging locations corresponding to the GPS information that is included in the supplementary information of the images are included in the predetermined range are continuously arranged.

It is preferable that the image analysis unit calculate a degree of similarity of the plurality of images respectively based on at least one of the result of the similar image determination process, the result of the face recognition process, the result of the frame determination process as the result of the image analysis, and the GPS information that is included in the supplementary information of the images, and that the time correction unit determine an amount of correction of imaging time of one or more images of which the imaging time that is included in the supplementary information of the images is corrected, according to the degree of similarity.

It is preferable that the time correction unit correct the imaging time that is included in the supplementary information of one or more images of which the imaging time that is included in the supplementary information of the images is corrected, in such a manner that the imaging time that is included in the supplementary information of one or more images of which the imaging time that is included in the supplementary information of the images is corrected is closer to the imaging time that is included in the supplementary information of the images which has a high degree of similarity among the previous and the next images in a case where the plurality of images are arranged in an order of imaging time that is included in the supplementary information of the images after the correction of the imaging time that is included in the supplementary information of one or more images of which the imaging time that is included in the supplementary information of the images is corrected.

It is preferable that the time correction unit correct the imaging time that is included in the supplementary information of one or more images of which the imaging time that is included in the supplementary information of the images is corrected in such a manner that, as the degree of similarity of the image which has the higher degree of similarity increases, the imaging time that is included in the supplementary information of one or more images of which the imaging time that is included in the supplementary information of the images is corrected is closer to the imaging time that is included in the supplementary information of the image which has the higher degree of similarity.

It is preferable that the time correction unit correct the imaging time that is included in the supplementary information of other images imaged by the same type of the imaging apparatus as that of one or more images of which the imaging time that is included in the supplementary information of the image is corrected among the plurality of images, or the imaging time that is included in the supplementary information of other images imaged at the predetermined range of imaging location that is the same as that of one or more images of which the imaging time that is included in the supplementary information of the image is corrected, based on the type of imaging device that is included in the supplementary information of the image and the GPS information that is included in the supplementary information of the image, by the same amount of correction as the amount of correction of one or more images of which the imaging time that is included in the supplementary information of the image is corrected.

It is preferable that, in a case where the similar image determination processing result is determined that there exist a plurality of groups of one or more images of which the imaging time that is included in the supplementary information of the image is corrected, the time correction unit correct the imaging time that is included in the supplementary information of the images included in a group other than the group of the largest amount of correction, by the amount of correction of the imaging time that is included in the supplementary information of the images included in the group of the largest amount of correction.

It is preferable that the image processing apparatus further include: a necessity determination unit that determines the necessity of the correction of the imaging time that is included in the supplementary information of the images based on whether or not two or more images are selected and used from each of the predetermined number of the groups divided based on the imaging time that is included in the supplementary information of the plurality of images, and in a case where the necessity determination unit determines that the correction of the imaging time that is included in the supplementary information of the images is necessary, the image analysis unit performs the image analysis of the images, and the time correction unit corrects the imaging time that is included in the supplementary information of the images.

It is preferable that the image processing apparatus further include: a display control unit that performs control for displaying the plurality of images on an image display unit, and the display control unit, in a case where the necessity determination unit determines that the correction of the imaging time that is included in the supplementary information of the images is necessary, the display control unit displays the plurality of images on the image display unit in an order of the imaging time that is included in the supplementary information of the images, and identifiably displays the plurality of images on the image display unit for each type of the imaging apparatus that is included in the supplementary information of the images or for each predetermined range of imaging location corresponding to the GPS information that is included in the supplementary information of the images.

It is preferable that, in a case where the necessity determination unit determines that the correction of the imaging time that is included in the supplementary information of the images is not necessary, the display control unit display the plurality of images on the image display unit in the order of the imaging time that is included in the supplementary information of the images for each imaging date, and identifiably display the plurality of images on the image display unit for each type of imaging apparatus that is included in the supplementary information of the images or for each predetermined range of imaging location corresponding to the GPS information that is included in the supplementary information of the images.

The present invention provides an image processing method including: an image analysis step in which an image analysis unit performs an image analysis of each image stored in the image storage unit that stores a plurality of images having supplementary information respectively; and a time correction step in which a time correction unit, in a case where the plurality of images are arranged in an order of the imaging time that is included in the supplementary information of the images, corrects the imaging time that is included in the supplementary information of the images in such a manner that the imaging time that is included in the supplementary information of the images are arranged in the order of actual imaging time of the images, based on at least one of a result of the image analysis and the GPS information that is included in the supplementary information of the images.

It is preferable that a similar image determination process as the image analysis be performed in the image analysis step, and that, in a case where the plurality of images are arranged in an order of imaging time that is included in the supplementary information of the images, the imaging time that is included in the supplementary information of one or more images among two or more images that are determined to be similar images be corrected in the time correction step, in such a manner that the two or more images that are determined to be similar images by the result of the similar image determination process are continuously arranged.

It is preferable that at least one of a face recognition process and a frame determination process be performed in the image analysis step as the image analysis, and that, in a case where the plurality of images are arranged in the order of imaging time that is included in the supplementary information of the images, the imaging time that is included in the supplementary information of one or more images among two or more images in which at least one of the same person and the same frame is determined to be imaged as the result of at least one of the face recognition process and the frame determination process be corrected in the time correction step, in such a manner that the two or more images in which at least one of the same person and the same frame is determined to be imaged are continuously arranged.

It is preferable that, in a case where the plurality of images are arranged in the order of imaging time that is included in the supplementary information of the images, the imaging time that is included in the supplementary information of one or more images among two or more images of which the imaging locations corresponding to the GPS information that is included in the supplementary information of the images that are included in the predetermined range be corrected in the time correction step, in such a manner that the two or more images of which the imaging locations corresponding to the GPS information that is included in the supplementary information of the images that are included in the predetermined range are continuously arranged.

The present invention provides a non-transitory computer readable recording medium for causing the computer to execute each step in the image processing method according to any of the above.

The present invention provides a non-transitory computer readable recording medium in which the program for causing the computer to execute each step in the image processing method according to any of the above is stored.

According to the present invention, it is possible to automatically and simply correct the mismatch between the imaging time that is included in the supplementary information of the images and the actual imaging time of the images based on at least one of the result of the image analysis and the GPS information that is included in the supplementary information of the images.

In this way, for example, using an automatic layout function for a photo book, it is possible to correctly perform the automatic layout even in a case of creating a photo book of a plurality of pages by dividing a plurality of images into a predetermined number of groups in which each of the images are continuously imaged within a predetermined time duration based on the imaging time that is included in the supplementary information of the images, and extracting the predetermined number of total images by extracting the images from each of the divided groups, and then using the extracted predetermined number of images.

DESCRIPTION OF THE PREFERRED EMBODIMENTS

Hereinafter, an image processing apparatus, an image processing method, and a non-transitory computer readable recording medium in the present invention will be described in detail based on the preferred embodiment illustrated in the drawings.

Figure 1:
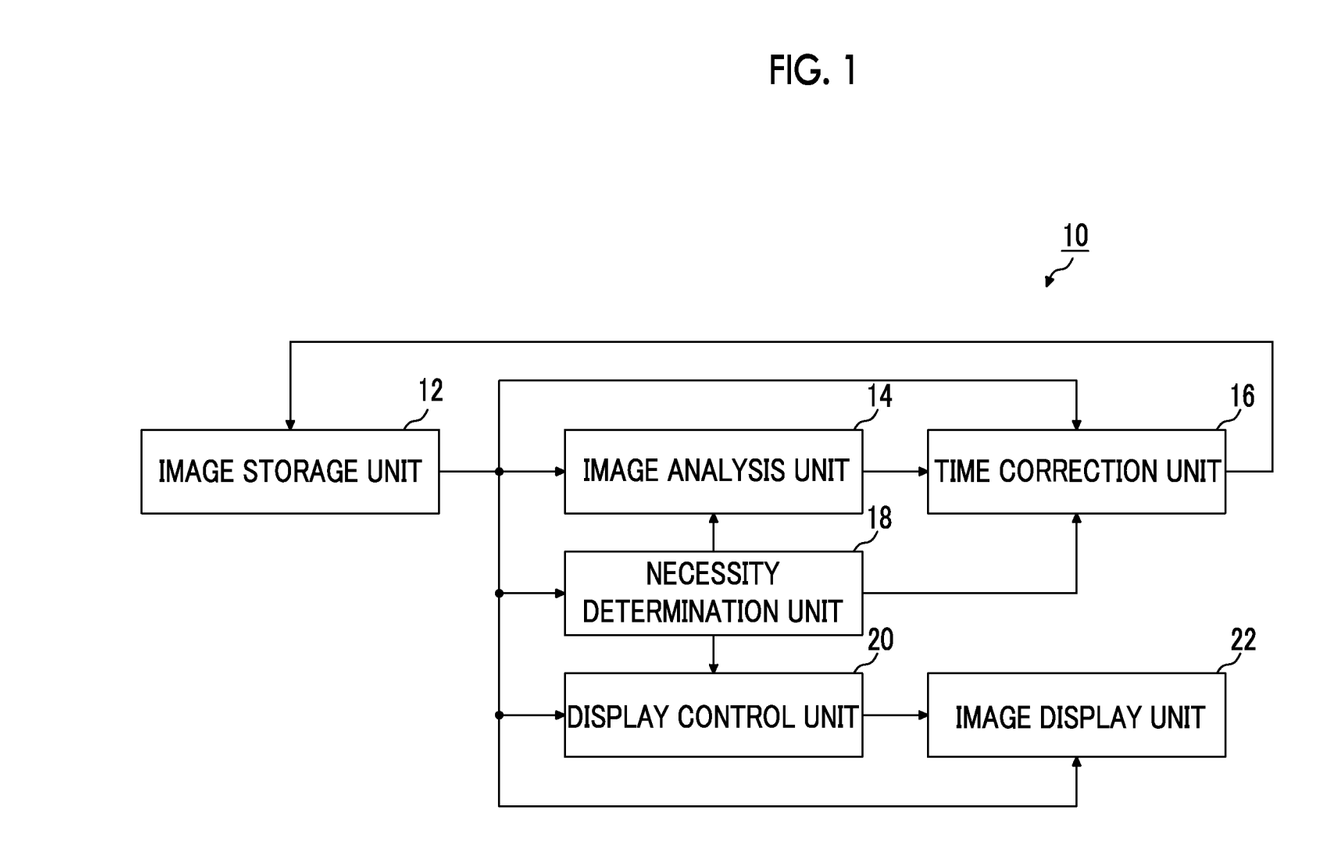
FIG. 1 is a block diagram illustrating a configuration of an image processing apparatus in an embodiment of the present invention.

FIG. 1 is a block diagram illustrating a configuration of an image processing apparatus in the embodiment of the present invention. The image processing apparatus 10 illustrated in FIG. 1, with regard to a plurality of images (image data) having respective supplementary information, automatically corrects a mismatch between an imaging time that is included in the supplementary information of the images and an actual imaging time of the image. The image processing apparatus 10 is configured to include an image storage unit 12, an image analysis unit 14, a time correction unit 16, a necessity determination unit 18, a display control unit 20, and an image display unit 22.

The image storage unit 12 stores a plurality of images (image data) having supplementary information respectively. The supplementary information of the images is various information including an imaging time, a type of imaging apparatus, and global positioning system (GPS) information, and is automatically assigned as image header information by the imaging apparatus when the image is imaged in the imaging apparatus.

The image storage unit 12 stores images (image data) in which the imaging time that is included in the supplementary information of the images is corrected by the time correction unit 16.

The necessity determination unit 18, in a case of creating a photo book, determines whether the correction of the imaging time that is included in the supplementary information of the images is necessary or not based on whether or not two or more images are selected and used from each of the predetermined number of groups divided based on the imaging time that is included in the supplementary information of the plurality of images. The detailed operation of the necessity determination unit 18 will be described below.

The image analysis unit 14, in a case where the necessity determination unit 18 determines that the correction of the imaging time that is included in the supplementary information of the images is necessary, performs an image analysis of each image stored in the image storage unit 12, for example, a similar image determination process, a face recognition process (including whether or not a face of a person is present in the image, a size of the face of the person, and the detection of the face position), and a frame determination process.

The image analysis unit 14 calculates a degree of similarity for each image of the plurality of images based on at least one of the result of the similar image determination process, the result of the face recognition process, the result of the frame determination process as the image analyses, and the GPS information that is included in supplementary information of the images.

The detailed description of the image analysis such as the similar image determination process, the face recognition process, and the frame determination process will be omitted. However, these image analyses can be performed by the various image analyses including the image analysis known in the related art.

The time correction unit 16, in a case where the necessity determination unit 18 determines that the correction of the imaging time that is included in the supplementary information of the images is necessary, corrects the imaging time that is included in the supplementary information of the images in such a manner that the images can be arranged in the order of actual imaging time in a case of arranging the plurality of images in the order of imaging time, based on the result of the image analysis by the image analysis unit 14, that is, based on at least one of the result of the similar image determination processing, the result of the face recognition processing, the result of the frame determination processing as the image analyses, and the GPS information that is supplementary information of the images. The detailed operation of the time correction unit 16 will be described below.

The image display unit 22 displays a plurality of images stored in the image storage unit 12 under a control by the display control unit 20.

The display control unit 20 performs the control for displaying the plurality of images stored in the image storage unit 12 on the image display unit 22.

The display control unit 20, in a case where the necessity determination unit 18 determines that the correction of the imaging time that is included in the supplementary information of the images is necessary, causes the plurality of images to be displayed on the image display unit 22 in an order of the imaging time that is included in the supplementary information of the plurality of images, and causes the images to be identifiably displayed on the image display unit 22 for each type of imaging apparatus that is included in the supplementary information of the images or for each imaging location within a predetermined range corresponding to the GPS information that is included in the supplementary information of the images.

The display control unit 20, in a case where the necessity determination unit 18 determines that the correction of the imaging time that is included in the supplementary information of the images is necessary, causes the plurality of images to be displayed on the image display unit 22 in the order of the imaging time that is included in the supplementary information of the images for each imaging date, and causes the images to be identifiably displayed on the image display unit 22 for each type of the imaging apparatus that is included in the supplementary information of the images or for each imaging location within a predetermined range corresponding to the GPS information that is included in the supplementary information of the images.

Next, a schematic operation of the image processing apparatus 10 will be described according to an image processing method in the present invention with reference to a flow chart illustrated in FIG. 2.

In a case where the correction of the imaging time that is included in the supplementary information of the images is performed, based on whether or not two or more images are selected and used from each of the predetermined number of groups divided based on the imaging time that is included in the supplementary information of the plurality of images, the necessity of the correction of the imaging time that is included in the supplementary information of the images is determined by the necessity determination unit 18 (STEP 51).

In a case where the necessity determination unit 18 determines that the correction of the imaging time that is included in the supplementary information of the images is necessary (Yes in STEP S2), for example, a plurality of images is displayed on the image display unit 22 under the control of the display control unit 20 in the order of the imaging time that is included in the supplementary information of the images, and is identifiably displayed on the image display unit 22 for each type of the imaging apparatus that is included in the supplementary information of the images by changing the color of the display frame of the image, for example (STEP S3).

Subsequently, the image analysis of each image stored in the image storage unit 12, that is, the similar image determination process, the face recognition process, and the frame determination process is performed by the image analysis unit 14 (STEP S4).

Subsequently, the imaging time that is included in the supplementary information of the images is corrected by the time correction unit 16 in such a manner that the images can be arranged in an order of actual imaging time in a case of arranging the plurality of images in the order of imaging time that is included in the supplementary information of the images, based on the result of the image analysis by the image analysis unit 14, that is, at least one of the result of the similar image determination processing, the result of the face recognition processing, and the result of the frame determination processing as the image analyses, and the GPS information that is supplementary information of the images (STEP S5). The image (image data) of which the imaging time that is included in the supplementary information of the images is corrected by the time correction unit 16 is stored in the image storage unit 12.

The plurality of images stored in the image storage unit 12, of which the imaging time that is included in the supplementary information of the images is corrected is displayed on the image display unit 22 in the order of the imaging time that is included in the supplementary information of the images by the display control unit 20 (STEP S6).

It is not essential to display the images on the image display unit 22 in STEP S3 and STEP S6, and thus the display can be appropriately performed according to the necessity.

On the other hand, in a case where the necessity determination unit 18 determines that the correction of the imaging time that is included in the supplementary information of the images is not necessary (No in STEP S2), the correction of the imaging time that is included in the supplementary information of the images by the time correction unit 16 is not performed (STEP S7).

In this case also, the display control unit 20, for example, may display the plurality of images stored in the image storage unit 12 on the image display unit 22 in the order of the imaging time that is included in the supplementary information of the images.

Next, the operation of the time correction unit 16 will be described.

The time correction unit 16, as described above, corrects the imaging time that is included in the supplementary information of the images based on at least one of the result of the similar image determination process, the result of the face recognition process, the result of the frame determination process which are the result of the image analysis, and the GPS information that is included in the supplementary information of the images.

First, the case where the time correction unit 16 corrects the imaging time that is included in the supplementary information of the images based on the result of the similar image determination process will be described.

In this case, the time correction unit 16 determines that two or more images of which the result of the similar image determination process is determined to be similar are in the same group. Then, the time correction unit 16, in a case where the plurality of images are arranged in the order of the imaging time that is included in the supplementary information of the images, corrects the imaging time that is included in the supplementary information of one or more images among two or more images that are determined to be the similar images in such a manner that the two or more images that are determined to be similar images are continuously arranged. For example, the imaging time that is included in the supplementary information of the images of one or more images that are not continuously arranged and of which the imaging time that is included in the supplementary information is late, is corrected in a direction of advancing the imaging time.

Figure 3:
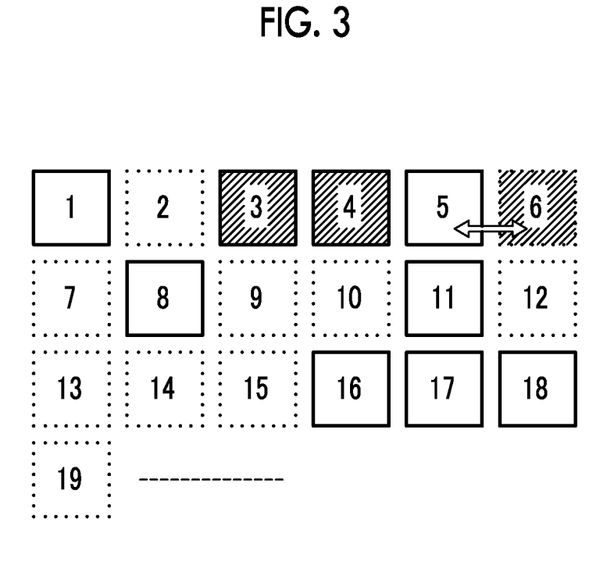
FIG. 3 is a conceptual diagram illustrating a state in which a plurality of images is arranged in the order of imaging time that is supplementary information of the images.

FIG. 3 is a conceptual diagram illustrating a state in which a plurality of images is arranged in the order of imaging time that is included in the supplementary information of the images. In FIG. 3, the plurality of images, as indicated in numbers, are arranged from left to right and from upper side to lower side of the drawing in the order of the imaging time that is included in the supplementary information of the images. The plurality of images is identifiably displayed for each type of the imaging apparatus that is included in the supplementary information of the images by changing the color of the display frames of the images. In the drawing, the images imaged by two types of imaging apparatuses are identifiably displayed by changing line types in correspondence to the change of the color of the display frames of the images.

As illustrated in FIG. 3, it is assumed that, in the result of the similar image determination process, the images 3, 4, and 6, for example, are determined to be similar images and are in the same group. In this case, the time correction unit 16, in a case where the plurality of images are arranged in the order of the imaging time that is included in the supplementary information of the images, corrects the imaging time that is included in the supplementary information of the image 6 among the images 3, 4, and 6 in a direction of advancing the imaging time in such a manner that the images 3, 4, and 6 are continuously arranged. Specifically, the time correction unit 16, for example, corrects the imaging time that is included in the supplementary information of the image 6 in such a manner that the imaging time that is included in the supplementary information of the image 6 falls between the imaging time that is included in the supplementary information of the image 4 and the imaging time that is included in the supplementary information of the image 5.

TABLE 1

| Images | Imaging time | Time difference [s] from the previous image |
|--------|--------------|---------------------------------------------|
| ... | | |
| 3 | Dec. 9, 2012 12:02:34 | |
| 4 | Dec. 9, 2012 12:02:48 | 14 |
| 5 | Dec. 9, 2012 12:03:50 | 62 |
| 6 | Dec. 9, 2012 12:04:12 | 22 |
| ... | | |

For example, in a case where the imaging times that are the supplementary information of the images 3 to 6 are as shown in Table 1, the time correction unit 16 corrects the imaging time that is included in the supplementary information of the image 6 in a direction of advancing the imaging time in a range of equal to more than 23 seconds and equal to less than 83 seconds in such a manner that the imaging time that is included in the supplementary information of the image 6 falls between the imaging time Dec. 9, 2012 12:02:48 that is included in the supplementary information of the image 4 and the imaging time Dec. 9, 2012 12:03:50 that is included in the supplementary information of the image 5. In this way, in a case where the plurality of images are arranged in the order of imaging time that is included in the supplementary information of the images, the order of the image 5 and the image 6 is reversed, and the images 3, 4, and 6 can be continuously arranged.

The time correction unit 16, based on the type of the imaging apparatus that is included in the supplementary information of the image, corrects the imaging time that is included in the supplementary information of the other images 2, 7, and 9 that are included in a certain group in which the images are determined to be similar images among the plurality of images, and are imaged by the same type of imaging apparatus as the image 6 of which the imaging time that is included in the supplementary information of the image is corrected, by the amount of correction same as the amount of correction of the imaging time that is included in the supplementary information of the image 6. In this way, it is possible to correct the mismatch between the imaging time that is included in the supplementary information of the images imaged by the same types of imaging apparatuses and the actual imaging time in a package.

Similarly, also in a case where the plurality of images are arranged in the order of imaging time that is included in the supplementary information of the images, and are identifiably displayed for each imaging location within a predetermined range corresponding to the GPS information which is the supplementary information of the images, the time correction unit 16, based on the GPS information that is included in the supplementary information of the images, corrects the imaging time that is included in the supplementary information of other images that are imaged at the same imaging location as the image 6 of which the imaging time that is included in the supplementary information of the image is corrected within a predetermined range among the plurality of images, by the amount of correction same as the amount of correction of the imaging time that is included in the supplementary information of the image 6.

In the example of Table 1, as described above, the time correction unit 16, for example, can correct the imaging time that is included in the supplementary information of the image 6 in a direction of advancing the imaging time within the range of 23 seconds to 83 seconds. However, specifically, it can be exemplified that the imaging time that is included in the supplementary information of the image 6 is corrected in a direction of advancing the imaging time by 53 seconds in such a manner that the imaging time that is included in the supplementary information of the image 6 becomes Dec. 9, 2012 12:03:19 which is the median time between the imaging time Dec. 9, 2012 12:02:48 that is included in the supplementary information of the image 4 and the imaging time Dec. 9, 2012 12:03:50 that is included in the supplementary information of the image 5. In this case, the imaging time that is included in the supplementary information of other images 2, 7, 9, . . . is also corrected in a direction of advancing the imaging time by 53 seconds.

Here, for example, if the imaging time that is included in the supplementary information of the image 6 is corrected in a direction of advancing the imaging time by 23 seconds, it is possible to rearrange the images 3, 4, and 6 in the order of actual imaging time. However, if the imaging time that is included in the supplementary information of the image 6 is corrected to be advancing and is closest to the imaging time that is included in the supplementary information of the image 5, and the imaging times that are the supplementary information of other images 2, 7, 9, . . . which are imaged by the same type of imaging apparatus as that of the image 6 are also similarly corrected in a direction of advancing the imaging time by 23 seconds, it may not be possible to rearrange other images 2, 7, 9, . . . in the order of actual imaging time.

In contrast, as described above, by correcting the imaging time that is included in the supplementary information of the image 6 to become the median time between the imaging time of the image 4 and 5, and also by similarly correcting the imaging times that are the supplementary information of other images 2, 7, 9, . . . which are imaged by the same type of imaging apparatus, it is possible to correct the imaging times that are the supplementary information of other images 2, 7, 9, . . . with a timing margin, and thus, it is possible to rearrange the images 2, 7, 9, . . . in the order of actual imaging time with higher accuracy.

The time correction unit 16, according to the degree of similarity of each of the plurality of images, may determine the amount of correction of one or more images of which the imaging time that is included in the supplementary information of the images is corrected.

In this case, the time correction unit 16 corrects the imaging time that is included in the supplementary information of one or more images of which the imaging time that is included in the supplementary information of the images is corrected in such a manner that the imaging time that is included in the supplementary information of one or more images of which the imaging time that is included in the supplementary information of the images is corrected is closer to the imaging time that is included in the supplementary information of the images which has a high degree of similarity among the previous and the next images in a case where the plurality of images are arranged in the order of imaging time that is included in the supplementary information of the images after the correction of the imaging time that is included in the supplementary information of one or more images of which the imaging time that is included in the supplementary information of the images is corrected.

Figure 4:
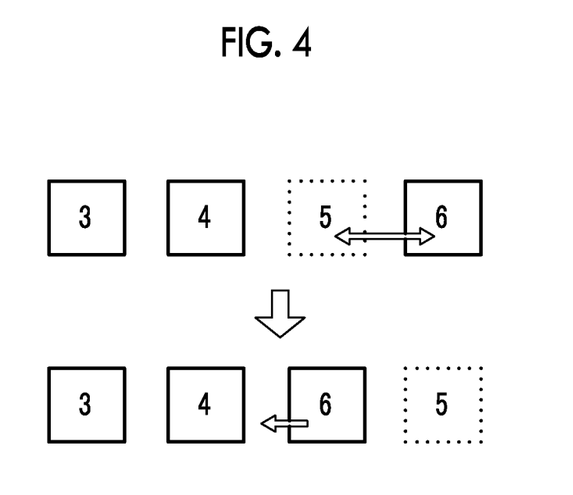
FIG. 4 is a conceptual diagram illustrating a state of determining an amount of correction of the image of which the imaging time that is included in the supplementary information of the images is corrected according to a degree of similarity.

For example, similarly, in a case where the result of the similar image determination process determines that the images 3, 4, and 6 are similar images, if the image 4 has a higher degree of similarity to the images 6 than the image 5, then the time correction unit 16, as illustrated in FIG. 4, corrects the imaging time that is included in the supplementary information of the image 6 in such a manner that the imaging time that is included in the supplementary information of the image 6 is closer to the imaging time Dec. 9, 2012 12:02:48 that is included in the supplementary information of the image 4 than to the imaging time Dec. 9, 2012 12:03:50 that is included in the supplementary information of the image 5.

In the case, the time correction unit 16 may change the amount of correction of the imaging time that is included in the supplementary information of the image 6 step-by-step according to the degree of similarity. That is, the time correction unit 16 corrects the imaging time that is included in the supplementary information of the image 6 in such a manner that, as the degree of similarity of the images 4 and 6 increases, the imaging time that is included in the supplementary information of the image 6 is closer to the imaging time that is included in the supplementary information of the image 4. Similarly, time correction unit 16 also corrects the imaging time that is included in the supplementary information of other images imaged by the same type of the imaging apparatuses as that of the image 6, by the amount of correction same as the amount of correction of the imaging time that is included in the supplementary information of the image 6.

Similarly, if the imaging time that is included in the supplementary information of the image 6 is corrected in a direction of advancing to the imaging time that is included in the supplementary information of the image 5, it is possible to correct the images 3, 4, and 6 in the order of the actual imaging time. As a result, the imaging time that is included in the supplementary information of the image 6 is closer to the imaging time that is included in the supplementary information of the image 5 than to the imaging time that is included in the supplementary information of the image 4. In this case, similarly, it may not be possible to rearrange other images imaged by the same type of imaging apparatuses as that of the image 6 in an order of actual imaging time.

In contrast, as described above, by determining the amount of correction of the imaging time that is included in the supplementary information of the image 6 according to the degree of similarity, and then, also similarly correcting the imaging time that is included in the supplementary information of other images imaged by the same type of the imaging apparatuses as that of the image 6, the imaging time that is included in the supplementary information of the other images can be corrected with a timing margin, and thus, it is possible to rearrange other images in the order of actual imaging time with higher accuracy.

In a case where the degree of similarity of the images 4 and 6 and the degree of similarity of the images 5 and 6 are almost the same, the time correction unit 16 corrects the imaging time that is included in the supplementary information of the image 6 in such a manner that the imaging time that is included in the supplementary information of the image 6 comes to the median time between the imaging time that is included in the supplementary information of the image 3 and the imaging time that is included in the supplementary information of the image 4.

It is preferable that the image analysis unit 14 calculate the degree of similarity of the images not only using the similar image determination process but also simultaneously using at least one of the face recognition process, the frame determination process and the GPS information which is the supplementary information of the images. In this way, it is possible to calculate the degree of similarity of the images with higher accuracy.

In a case where the result of the similar image determination processing determines that there exists a plurality of groups of images of which the imaging time that is included in the supplementary information of the image is corrected, the time correction unit 16 may correct the imaging time that is included in the supplementary information of the images included in a group other than the group of largest amount of correction, by the amount of correction of the imaging time that is included in the supplementary information of the images included in the group of largest amount of correction.

TABLE 2

| Images | Amount of correction of the imaging time |
|---|---|
| 6 | Advancing by 23 seconds or more |
| 12 | Advancing by 7 seconds or more |
| 19 | Advancing by 24 seconds or more |
| ... | |

For example, in a case where the amount of correction of the imaging time that is included in the supplementary information of the group of the similar images including the image 6, the group of the similar images including the image 12, the group of the similar images including the image 19, . . . are assumed to be as indicated in Table 2. In this case, the time correction unit 16 corrects the imaging time that is included in the supplementary information of the images included in a group of similar images other than the group of largest amount of correction, by the amount of correction of the imaging time that is included in the supplementary information of the group of the similar images including the image 19 of which the amount of correction is the largest of 24 seconds or more.

The display control unit 20 does not identifiably display the plurality of images for each type of the imaging apparatus on the image display unit 22, but can identifiably display for each predetermined range of imaging location corresponding to the GPS information that is included in the supplementary information of the images on the image display unit 22. In this case, the display control unit 20 identifiably displays, for example, the images imaged domestically and the images imaged overseas, or the images imaged domestically and the images imaged in a location where the time zone is different from that of the country on the image display unit 22.

In case where the display control unit 20 identifiably displays for each predetermined range of imaging location corresponding to the GPS information that is included in the supplementary information of the images on the image display unit 22 also, similarly, the time correction unit 16 corrects the imaging time that is included in the supplementary information of other images imaged at the predetermined range of imaging location that is same as the images of which the imaging time that is included in the supplementary information of the image is corrected, by the same amount of correction as the amount of correction of the imaging time that is included in the supplementary information of the image of which the imaging time that is included in the supplementary information of the image is corrected.

It is not essential to identifiably display the plurality of images. However, by identifiably displaying the plurality of images, it becomes possible for the user to recognize the group of images that have a possibility of mismatch between the actual imaging time and the imaging time that is included in the supplementary information of the image.

For example, it is presented to the user that there is a mismatch between the imaging time that is included in the supplementary information of the image and the actual imaging time by identifiably displaying the plurality of images arranged in the order of imaging time that is included in the supplementary information of the image, and by displaying the group in which the images are determined to be similar images. In this way, the user can check whether or not the determination by the time correction unit 16 is correct, or determine whether or not the correction of the imaging time that is included in the supplementary information of the image is necessary and then instruct the time correction unit 16 to perform the correction via a not illustrated instruction input unit.

Subsequently, a case where the time correction unit 16 corrects the imaging time that is included in the supplementary information of the images based on at least one of the result of the face recognition processing and the result of the frame determination processing will be described.

In this case, the time correction unit 16 determines that two or more images in which at least one of the same person and the same frame are determined to the same group based on at least one the result of the face recognition processing and the result of the frame determination processing. Then, the time correction unit 16, in a case where the plurality of images are arranged in the order of imaging time that is included in the supplementary information of the images, corrects the imaging time that is included in the supplementary information of one or more images among two or more images in which at least one of the same person and the same frame are determined to be imaged in such a manner that the two or more images which are determined to be imaged in at least one of the same person and the same frame based on at least one of the face recognition processing and the frame determination processing are continuously arranged. For example, the imaging time that is included in the supplementary information of one or more images which are not continuously arranged and of which the imaging time that is included in the supplementary information of the images is late, is corrected in a direction of advancing the imaging time.

TABLE 3

| Images | Persons | Face size, face position |
|---|---|---|
| ... | | |
| 3 | Mr./Ms. A, Mr./Ms. B | (Size of face and face position for each person) |
| 4 | Mr./Ms. A, Mr./Ms. B | |
| 5 | Mr./Ms. A | |
| 6 | Mr./Ms. A, Mr./Ms. B | |
| ... | | |

For example, as indicated in Table 3, if the same Mr./Ms. A and Mr./Ms. B are imaged in the images 3, 4, and 6, and the face position and the face size of Mr./Ms. A and Mr./Ms. B imaged in the images 3, 4, and 6 are the same, the time correction unit 16 determines that the images 3, 4, and 6 are in the same group, and in a case where the plurality of images are arranged in the order of imaging time that is included in the supplementary information of the images, corrects the imaging time that is included in the supplementary information of the image 6 in a direction of advancing the imaging time in such a manner that the images 3, 4, and 6 are continuously arranged. In a case where the images are determined to be in the same group based on the frame of the images, the correction is also performed in a similar way.

A detail method of correcting the imaging time that is included in the supplementary information of the images in a case of correcting the imaging time that is included in the supplementary information of the image based on at least one of the result of the face recognition process and the result of the frame determination process, is similar to a case of correcting the imaging time that is included in the supplementary information of the image based on the result of the similar image determination process.

There is a possibility that the imaging conditions such as the color of the images or turning of the flash ON and OFF may be different depending on each type of the imaging apparatus. For this reason, it is preferable for the time correction unit 16 to determine whether or not the images are in the same group by considering the face position of the person, the face size, the frame, the imaging location not only using the similar image determination processing described above but also using the face recognition processing, the frame determination processing, and the GPS information that is included in the supplementary information of the images. For example, whether the images are in the same group or not may be determined by combining another image processing such as considering the brightness or color tone of the image.

Subsequently, a case where the time correction unit 16 corrects the imaging time that is included in the supplementary information of the images based on the GPS information that is included in the supplementary information of the image will be described.

In this case, the time correction unit 16 determines that two or more images of which the imaging locations are included in the predetermined range are in the same group. Then, the time correction unit 16, in a case where the plurality of images are arranged in the order of imaging time that is included in the supplementary information of the images, corrects the imaging time that is included in the supplementary information of one or more images among the two or more images of which the imaging locations are included in the predetermined range in such a manner that the two or more images of which the imaging locations corresponding to the GPS information that is included in the supplementary information of the images are included in the predetermined range are continuously arranged. For example, the imaging time that is included in the supplementary information of the images that is not continuously arranged and of which the imaging time that is included in the supplementary information is late, is corrected.

A detail method of correcting the imaging time that is included in the supplementary information of the images in a case of correcting the imaging time that is included in the supplementary information of the image based on the GPS information, is similar to the case of correcting the imaging time that is included in the supplementary information of the image based on the result of the similar image determination processing.

Next, the operation of the necessity determination unit 18 will be described.

It is considered that, in many cases, the images in the same group such as the images of a wedding ceremony or a school entrance ceremony are continuously imaged within the predetermined time duration. Therefore, for example, a case of creating a photo book of a plurality of pages is assumed, by dividing a plurality of images into a predetermined number of groups in which each of the images are continuously imaged within a predetermined time duration based on the imaging time that is included in the supplementary information of the images, and selecting the predetermined number of total images by selecting the images from each of the divided groups, and then using the selected predetermined number of images.

In this case, whether the correction of imaging time that is included in the supplementary information of the images is necessary or not is dependent upon the number of images used in photo book or the number of pages of the photo book.

Specifically, in a case where the number of images used per day is larger than the number of divided groups, even though the images are selected one by one from each of the divided groups, since two or more images are selected from one or more divided groups, there is a possibility of a mismatch of a couple of minutes in the imaging time that is included in the supplementary information of the images. That is, regarding the predetermined number of groups, in a case where two or more images are selected from the same group and used in the photo book, the correction of the imaging time that is included in the supplementary information of the images is necessary.

TABLE 4

| | | Photo book on creation | | |
|---|---|---|---|---|
| Case | Group of images | Number of images | Number of pages | Number of images |
| 1 | Group of images for 3 nights and 4 days | 200 | 30 | 120 |
| 2 | Group of images for 1 year | 2000 | 48 | 192 |
| 3 | ... | | | |

For example, as indicated in Case 1 in Table 4, a case of creating a photo book of 30 pages is assumed, by dividing two hundreds of images imaged in three nights and four days into a predetermined number of groups based on the imaging time that is included in the supplementary information of the images, and selecting total 120 images by selecting the images from each of the predetermined number of divided groups, and then using the selected 120 images. In this case, on average, 30 images per day are selected and used in creating the photo book.

On the other hand, as indicated in Case 2 in Table 4, a case of creating a photo book of 48 pages is assumed, by dividing two thousands of images imaged in one year into a predetermined number of groups based on the imaging time that is included in the supplementary information of the images, and selecting total 192 images by selecting the images from each of the divided groups, and then using the selected 192 images. In this case, on average, 1.28 images per day are selected and used in creating the photo book.

In the case of Case 1, since the number of images used per day is 30, in a case where the images are selected one by one from each of the divided groups, if the number of group is equal to or more than 30, then the number of images selected from each of the groups is less than one, thus, the mismatch of a couple of minutes in the imaging time that is included in the supplementary information of the images may not be a problem. Therefore, the necessity determination unit 18, in a case where the number of group is equal to or more than 30, determines that the correction of the imaging time that is included in the supplementary information of the images is not necessary, and in case where the number of group is less than 29, determines that the correction of the imaging time that is included in the supplementary information of the images is necessary.

In contrast, in the case of Case 2, since the number of images used per day is 1.28, in a case where the images are selected one by one from each of the divided groups, if the number of groups is equal to or more than two, then the number of images selected from each of the groups is less than one, thus, the mismatch with a couple of minutes in the imaging time may not be a problem. Therefore, the necessity determination unit 18, in a case where the number of group is equal to or more than two, determines that the correction of the imaging time that is included in the supplementary information of the images is not necessary, and in case where the number of group is one, determines that the correction of the imaging time that is included in the supplementary information of the images is necessary.

The description was made with the exemplary case of a photo book of a plurality of pages. However, the description is not limited to the photo book or the plurality of pages. It can be similarly applicable to a case where the images are selected from each of the predetermined number of groups divided based on the imaging time that is included in the supplementary information of the plurality of images, and is used in some applications.

As described above, in the example illustrated in FIG. 2, a plurality of images are arranged in an order of the imaging time that is included in the supplementary information of the images, and are identifiably displayed for each type of imaging apparatus in such a manner that the user can recognize the group of images that has a possibility of mismatch in the imaging time that is included in the supplementary information of the image.

Figure 2:
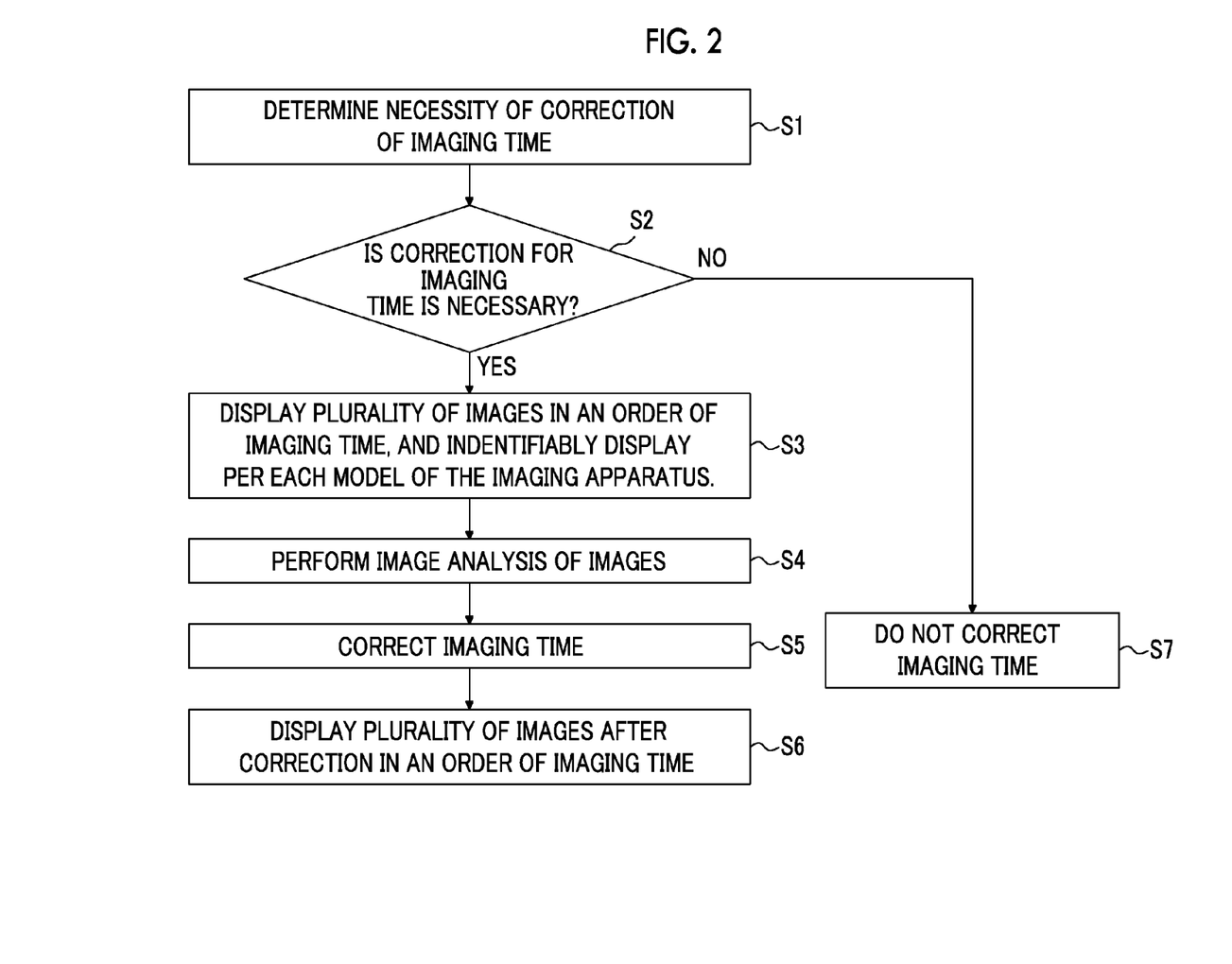
FIG. 2 is a flow chart illustrating a schematic operation of the image processing apparatus illustrated in FIG. 1.

In a case where the necessity determination unit 18 determines that the correction of the imaging time that is included in the supplementary information of the images is necessary, as in the example illustrated in FIG. 2, it is preferable for the display control unit 20 to set "the identifiably display for each type of imaging apparatus" to be ON as a default value in a case where the plurality of images are arranged in the order of imaging time that is included in the supplementary information of the images. Conversely, in a case where the necessity determination unit 18 determines that the correction of the imaging time that is included in the supplementary information of the images is not necessary, it is preferable for the display control unit 20 to set "the identifiably display for each type of imaging apparatus" to be OFF as a default value.

Figure 5:
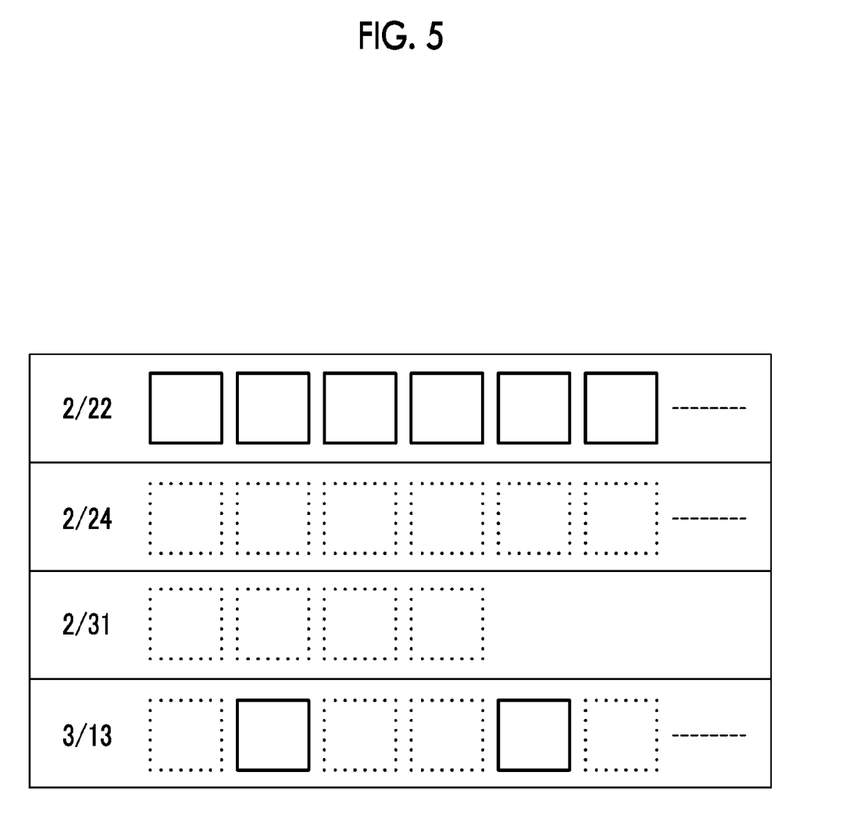
FIG. 5 is a conceptual diagram illustrating a state in which a plurality of images is arranged in the order of the imaging time for each date that is included in the supplementary information of the image.

In a case where the necessity determination unit 18 determines that the correction of the imaging time that is included in the supplementary information of the images is not necessary, it is not necessary to correct the imaging time that is included in the supplementary information of the images on a time basis. However, it is considered that a case of correction on daily basis may be necessary. Therefore, as illustrated in FIG. 5, it is preferable to arrange a plurality of images in an order of imaging time that is included in the supplementary information of the images for each date, and identifiably display for each type of imaging apparatus. In this way, it is possible for the user to recognize whether the mismatch of the imaging time that is included in the supplementary information of the images on daily basis occurs or not.

As described above, in the image processing apparatus 10, it is possible to automatically and simply correct the mismatch between the imaging time that is included in the supplementary information of the images and the actual imaging time of the images based on at least one of the result of the image analysis and the GPS information that is included in the supplementary information of the images.

In this way, for example, using an automatic layout function for a photo book, it is possible to correctly perform the automatic layout even in a case of creating a photo book of a plurality of pages by dividing a plurality of images into a predetermined number of groups in which each of the images are continuously imaged within a predetermined time duration based on the imaging time that is included in the supplementary information of the plurality of images, and extracting the predetermined number of total images by extracting the images from each of the predetermined number of divided groups, and then using the extracted predetermined number of images.

An image processing method of the present invention can be realized as a program to cause the computer to execute each of the steps. In addition, it may be realized by a computer readable recording medium in which the program is stored.

The present invention is basically as described above.

The details of the present invention is described above. However, the present invention is not limited to the embodiment described above, and various improvements and modifications can be made without departing from the scope and spirit of the present invention as a matter of course.

What is claimed is:

1. An image processing apparatus comprising:
   an image storage unit that stores a plurality of images having supplementary information respectively;
   an image analysis unit that performs an image analysis of each image stored in the image storage unit; and
   a time correction unit that corrects an imaging time that is included in the supplementary information of the image in such a manner that the plurality of images are arranged in an actual imaging time of the images in a case where the plurality of images are arranged in an order of the imaging time among the supplementary information, the time correction unit correcting the imaging time based on both i) a result of the image analysis by the image analysis unit and ii) a GPS information that is included in the supplementary information of the images, wherein the image analysis is a similar image determination processing that determines when two or more images are similar, wherein, in a case where the plurality of images are arranged in the order of the imaging time that is included in the supplementary information of the images, the time correction unit corrects the imaging time that is included in the supplementary information of one or more images among the two or more images that are determined to be similar images, in such a manner that the two or more images that are determined to be similar images, by the result of the similar image determination processing, are continuously arranged based on the corrected imaging time, and wherein the time correction unit corrects the imaging time that is included in the supplementary information of other images imaged by the same type of the imaging apparatus as that of one or more images of which the imaging time that is included in the supplementary information of the image is corrected among the plurality of images, or the imaging time that is included in the supplementary information of other images imaged at a predetermined geographic range of imaging location that is the same as that of one or more images of which the imaging time that is included in the supplementary information of the image is corrected, based on the type of the imaging device that is included in the supplementary information of the image and the GPS information that is included in the supplementary information of the image, by the same amount of correction as the amount of correction of one or more images of which the imaging time that is included in the supplementary information of the image is corrected.

2. The image processing apparatus according to claim 1, wherein the image analysis unit performs at least one of a face recognition process and a frame determination process as the image analysis, and wherein, in a case where the plurality of images are arranged in the order of imaging time that is included in the supplementary information of the images, the time correction unit corrects the imaging time that is included in the supplementary information of one or more images among two or more images in which at least one of the same person and the same frame is determined to be imaged as the result of at least one of the face recognition processing and the frame determination processing, in such a manner that the two or more images in which at least one of the same person and the same frame is determined to be imaged are continuously arranged.

3. The image processing apparatus according to claim 1, wherein, in a case where the plurality of images are arranged in the order of imaging time that is included in the supplementary information of the images, the time correction unit corrects the imaging time that is included in the supplementary information of one or more images among two or more images of which the imaging locations corresponding to the GPS information that is included in the supplementary information of the images are included in a predetermined geographic range, in such a manner that the two or more images of which the imaging locations corresponding to the GPS information that is included in the supplementary information of the images are included in the predetermined geographic range are continuously arranged.

4. The image processing apparatus according to claim 1, wherein the image analysis unit calculates a degree of similarity of the plurality of images respectively based on at least one of the result of the similar image determination processing, the result of the face recognition processing, and the result of the frame determination processing as the result of the image analysis, and the GPS information that is included in the supplementary information of the images, and wherein the time correction unit determines an amount of correction of imaging time of one or more images of which the imaging time that is included in the supplementary information of the images is corrected, according to the degree of similarity.

5. The image processing apparatus according to claim 4, wherein the time correction unit corrects the imaging time that is included in the supplementary information of one or more images of which the imaging time that is included in the supplementary information of the images is corrected, in such a manner that the imaging time that is included in the supplementary information of one or more images of which the imaging time that is included in the supplementary information of the images is corrected is closer to the imaging time that is included in the supplementary information of the images which has a high degree of similarity among the previous and the next images in a case where the plurality of images are arranged in an order of imaging time that is included in the supplementary information of the images after the correction of the imaging time that is included in the supplementary information of one or more images of which the imaging time that is included in the supplementary information of the images is corrected.

6. The image processing apparatus according to claim 5, wherein the time correction unit corrects the imaging time that is included in the supplementary information of one or more images of which the imaging time that is included in the supplementary information of the images is corrected in such a manner that, as the degree of similarity of the image which has the higher degree of similarity increases, the imaging time that is included in the supplementary information of one or more images of which the imaging time that is included in the supplementary information of the images is corrected is closer to the imaging time that is included in the supplementary information of the image which has the higher degree of similarity.

7. The image processing apparatus according to claim 1, wherein, in a case where the similar image determination processing result determines that there exists a plurality of groups of one or more images of which the imaging time that is included in the supplementary information of the image is corrected, the time correction unit corrects the imaging time that is included in the supplementary information of the images included in a group other than the group of the largest amount of correction, by the amount of correction of the imaging time that is included in the supplementary information of the images included in the group of the largest amount of correction.

8. The image processing apparatus according to claim 1, further comprising:

a necessity determination unit that determines the necessity of the correction of the imaging time that is included in the supplementary information of the images based on whether or not two or more images are selected and used from each of a predetermined number of the groups divided based on the imaging time that is included in the supplementary information of the plurality of images, wherein, in a case where the necessity determination unit determines that the correction of the imaging time that is included in the supplementary information of the images is necessary, the image analysis unit performs the image analysis of the images, and the time correction unit corrects the imaging time that is included in the supplementary information of the images.

9. The image processing apparatus according to claim 8, further comprising:

a display control unit that performs a control for displaying the plurality of images on an image display unit, wherein, in a case where the necessity determination unit determines that the correction of the imaging time that is included in the supplementary information of the images is necessary, the display control unit displays the plurality of images on the image display unit in an order of the imaging time that is included in the supplementary information of the images, and identifiably displays the plurality of images on the image display unit for each type of the imaging apparatus that is included in the supplementary information of the images or for each predetermined geographic range of imaging location corresponding to the GPS information that is included in the supplementary information of the images.

10. The image processing apparatus according to claim 9, wherein, in a case where the necessity determination unit determines that the correction of the imaging time that is included in the supplementary information of the images is not necessary, the display control unit displays the plurality of images on the image display unit in an order of the imaging time that is included in the supplementary information of the images for each imaging date, and identifiably displays the plurality of images on the image display unit for each type of the imaging apparatus that is included in the supplementary information of the images or for each predetermined geographic range of imaging location corresponding to the GPS information that is included in the supplementary information of the images.

11. An image processing method in which each step is performed using the image processing apparatus according to claim 1, comprising:

an image analysis step in which an image analysis unit performs an image analysis of each image stored in the image storage unit that stores a plurality of images having supplementary information respectively; and a time correction step in which a time correction unit, in a case where the plurality of images are arranged in an order of the imaging time that is included in the supplementary information of the images, corrects the imaging time that is included in the supplementary information of the images in such a manner that the imaging time that is included in the supplementary information of the images is arranged in an order of actual imaging time of the images, based on a result of the image analysis and the GPS information that is included in the supplementary information of the images, wherein the image analysis step includes a similar image determination processing that determines when two or more images are similar, wherein, in a case where the plurality of images are arranged in the order of the imaging time that is included in the supplementary information of the images, the time correction unit corrects the imaging time that is included in the supplementary information of one or more images among the two or more images that are determined to be similar images, in such a manner that the two or more images that are determined to be similar images, by the result of the similar image determination processing, are continuously arranged based on the corrected imaging time, and wherein the time correction unit corrects the imaging time that is included in the supplementary information of other images imaged by the same type of the imaging apparatus as that of one or more images of which the imaging time that is included in the supplementary information of the image is corrected among the plurality of images, or the imaging time that is included in the supplementary information of other images imaged at a predetermined geographic range of imaging location that is the same as that of one or more images of which the imaging time that is included in the supplementary information of the image is corrected, based on the type of the imaging device that is included in the supplementary information of the image and the GPS information that is included in the supplementary information of the image, by the same amount of correction as the amount of correction of one or more images of which the imaging time that is included in the supplementary information of the image is corrected.

12. The image processing method according to claim 11, wherein a similar image determination process as the image analysis is performed in the image analysis step, and wherein, in a case where the plurality of images are arranged in an order of imaging time that is included in the supplementary information of the images, the imaging time that is included in the supplementary information of one or more images among two or more images that are determined to be similar images is corrected in the time correction step, in such a manner that the two or more images that are determined to be similar images by the result of the similar image determination processing are continuously arranged.

13. The image processing method according to claim 12, wherein at least one of the face recognition processing and the frame determination processing is performed in the image analysis step as the image analysis, and wherein, in a case where the plurality of images are arranged in the order of imaging time that is included in the supplementary information of the images, the imaging time that is included in the supplementary information of one or more images among two or more images in which at least one of the same person and the same frame is determined to be imaged as the result of at least one of the face recognition processing and the frame determination processing is corrected in the time correction step, in such a manner that the two or more images in which at least one of the same person and the same frame is determined to be imaged are continuously arranged.

14. The image processing method according to claim 12, wherein, in a case where the plurality of images are arranged in the order of imaging time that is included in the supplementary information of the images, the imaging time that is included in the supplementary information of one or more images among two or more images of which the imaging locations corresponding to the GPS information that is included in the supplementary information of the images are included in the predetermined geographic range is corrected in the time correction step, in such a manner that the two or more images of which the imaging locations corresponding to the GPS information that is included in the supplementary information of the images are included in the predetermined geographic range are continuously arranged.

15. The image processing method according to claim 11, wherein at least one of a face recognition processing and a frame determination processing is performed in the image analysis step as the image analysis, and wherein, in a case where the plurality of images are arranged in the order of imaging time that is included in the supplementary information of the images, the imaging time that is included in the supplementary information of one or more images among two or more images in which at least one of the same person and the same frame is determined to be imaged as the result of at least one of the face recognition processing and the frame determination processing is corrected in the time correction step, in such a manner that the two or more images in which at least one of the same person and the same frame is determined to be imaged are continuously arranged.

16. The image processing method according to claim 11, wherein, in a case where the plurality of images are arranged in the order of imaging time that is included in the supplementary information of the images, the imaging time that is included in the supplementary information of one or more images among two or more images of which the imaging locations corresponding to the GPS information that is included in the supplementary information of the images are included in the predetermined geographic range is corrected in the time correction step, in such a manner that the two or more images of which the imaging locations corresponding to the GPS information that is included in the supplementary information of the images are included in the predetermined geographic range are continuously arranged.

17. A non-transitory computer readable recording medium having recorded thereon a program for causing the image processing apparatus according to claim 1 to function as a computer, comprising:

an image storage unit that stores a plurality images having supplementary information respectively;

an image analysis unit that performs an image analysis of each image stored in the image storage unit; and a time correction unit that corrects an imaging time that is included in the supplementary information of the image in such a manner that the plurality of images are arranged in an actual imaging time of the images in a case where the plurality of images are arranged in an order of the imaging time among the supplementary information, based on a result of the image analysis by the image analysis unit and a GPS information that is included in the supplementary information of the images, wherein the image analysis step includes a similar image determination processing that determines when two or more images are similar, wherein, in a case where the plurality of images are arranged in the order of the imaging time that is included in the supplementary information of the images, the time correction unit corrects the imaging time that is included in the supplementary information of one or more images among the two or more images that are determined to be similar images, in such a manner that the two or more images that are determined to be similar images, by the result of the similar image determination processing, are continuously arranged based on the corrected imaging time, and wherein the time correction unit corrects the imaging time that is included in the supplementary information of other images imaged by the same type of the imaging apparatus as that of one or more images of which the imaging time that is included in the supplementary information of the image is corrected among the plurality of images, or the imaging time that is included in the supplementary information of other images imaged at a predetermined geographic range of imaging location that is the same as that of one or more images of which the imaging time that is included in the supplementary information of the image is corrected, based on the type of the imaging device that is included in the supplementary information of the image and the GPS information that is included in the supplementary information of the image, by the same amount of correction as the amount of correction of one or more images of which the imaging time that is included in the supplementary information of the image is corrected.

18. An image processing apparatus comprising:

an image storage unit that stores a plurality of images having supplementary information respectively;

an image analysis unit that performs an image analysis of each image stored in the image storage unit; and a time correction unit that corrects an imaging time that is included in the supplementary information of the image in such a manner that the plurality of images are arranged in an actual imaging time of the images in a case where the plurality of images are arranged in an order of the imaging time among the supplementary information, the time correction unit correcting the imaging time based on both i) a result of the image analysis by the image analysis unit and ii) a GPS information that is included in the supplementary information of the images, wherein the image analysis is a similar image determination processing that determines when two or more images are similar, wherein, in a case where the plurality of images are arranged in the order of the imaging time that is included in the supplementary information of the images, the time correction unit corrects the imaging time that is included in the supplementary information of one or more images among the two or more images that are determined to be similar images, in such a manner that the two or more images that are determined to be similar images, by the result of the similar image determination processing, are continuously arranged based on the corrected imaging time, and wherein, in a case where the similar image determination processing result determines that there exists a plurality of groups of one or more images of which the imaging time that is included in the supplementary information of the image is corrected, the time correction unit corrects the imaging time that is included in the supplementary information of the images included in a group other than the group of the largest amount of correction, by the amount of correction of the imaging time that is included in the supplementary information of the images included in the group of the largest amount of correction.

* * * * *